L. E. THOMPSON.
AUTOMOBILE WATER BAG HOLDER.
APPLICATION FILED FEB. 24, 1919.
1,392,092. Patented Sept. 27, 1921.
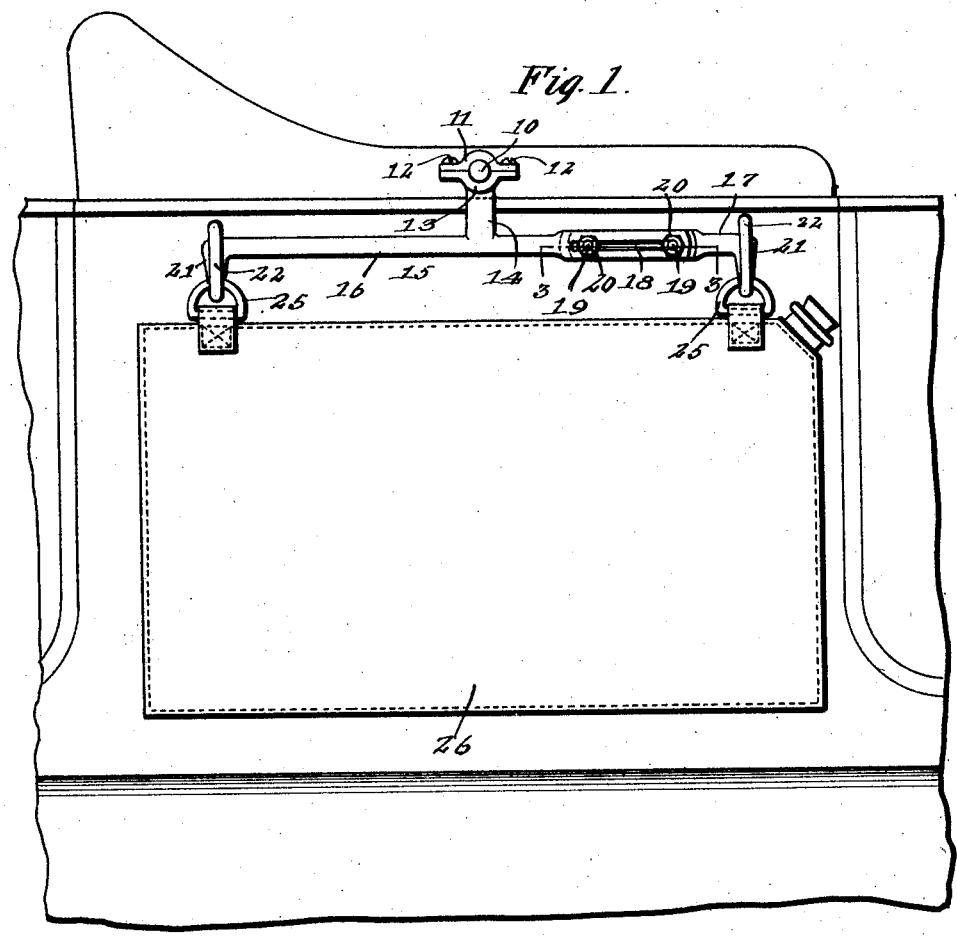
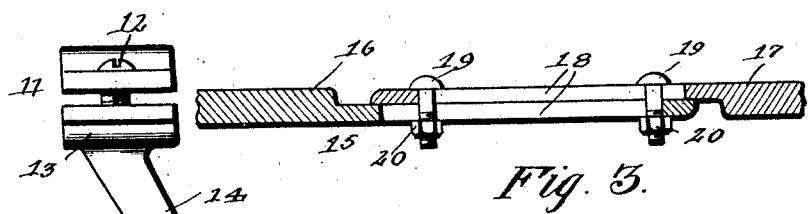
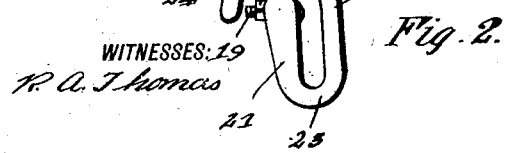
INVENTOR
L. E. Thompson
BY
Victor J. Evans
ATTORNEY

UNITED STATES PATENT OFFICE.

LOYD E. THOMPSON, OF ISLAND CITY, OREGON.

AUTOMOBILE-WATER-BAG HOLDER.

1,392,092.  Specification of Letters Patent.  Patented Sept. 27, 1921.

Application filed February 24, 1919. Serial No. 278,791.

*To all whom it may concern:*

Be it known that I, LOYD E. THOMPSON, a citizen of the United States, residing at Island City, in the county of Union and State of Oregon, have invented new and useful Improvements in Automobile-Water-Bag Holders, of which the following is a specification.

This invention relates to removable brackets and is especially designed for holding a water bag in position upon a vehicle in a convenient manner where it will not contact with or mar the side of the vehicle.

Another object is to provide a holder which is capable of adjustment to bags of different sizes, by making the hooks to which the bag is connected, relatively adjustable.

A further object is to provide a novel form of hook for the reception of the rings of eyes carried by the bag, the said hook retaining the eyes against accidental displacement, but at the same time permitting of their ready removal when desired.

Other objects and advantages of the invention will appear as the following description is read in connection with the accompanying drawings.

In the drawings:—

Figure 1 is a side elevation showing a fragmentary portion of an automobile with the invention applied thereto.

Fig. 2 is an end view of the bracket detached and

Fig. 3 is a detail sectional view on the line 3—3 of Fig. 1.

Referring to the drawings in detail, wherein like characters of reference denote corresponding parts, the numeral 10 indicates one of the supports for the top of an automobile of usual construction. This support is designed also to support the bracket which consists of a clamp 11, which may be removably secured upon a support 10 through the medium of screws 12. One member 13 of the clamp has projecting at an angle therefrom, an arm 14, the outer end of which carries a right angularly extending arm 15, which is composed of sections 16 and 17. These sections are connected together so as to regulate the length of the arm and for this purpose are each provided with longitudinally disposed slots 18. Extending through the slots 18 are clamping members 19 in the form of headed bolts which receive on their threaded ends nuts 20.

The outer ends of each of the sections 16 and 17 are provided with a novel form of hooks, which is composed of a substantially right angular extending portion 21 and a substantially parallel portion 22, which are connected as shown at 23. The free end of the parallel portion 22 terminates in a semi-circular extension 24, whose extremity is positioned upon the opposite side of the portion 21, so as to form an offset entrance or mouth for the slot which is formed by the portions 21 and 22 and which is adapted to receive a ring 25 carried by the water bag 26.

When in position, the brackets form a convenient means for carrying the water bag or other article, the novel formation of the hooks permitting of the ready adjustment of the bag thereon, but at the same time holding the said bag from being accidentally jolted from its position.

The invention is susceptible of changes in its form, proportions and minor details of construction and the right is herein reserved to make such changes as properly fall within the scope of the appended claims.

I claim:—

1. A bracket comprising a longitudinally extensible arm, means for removably securing the arm to a support, hooks located at each end of said arm, said hooks comprising laterally extending parallel portions forming a slot and a curved extension formed by a continuation of one of the parallel portions and positioned across the entrance of said slot.

2. A bracket comprising a longitudinally extensible arm, means for removably securing the arms to a support, hooks located at each end of said arm, said hooks including a laterally disposed seat formed by bending the hooks to provide a substantially straight slot and an open offset mouth providing an entrance to said slot.

In testimony whereof I affix my signature.

LOYD E. THOMPSON.